G. T. HANCHETT.
GEAR SHIFTING DEVICE.
APPLICATION FILED JULY 24, 1914.
1,152,809.
Patented Sept. 7, 1915.
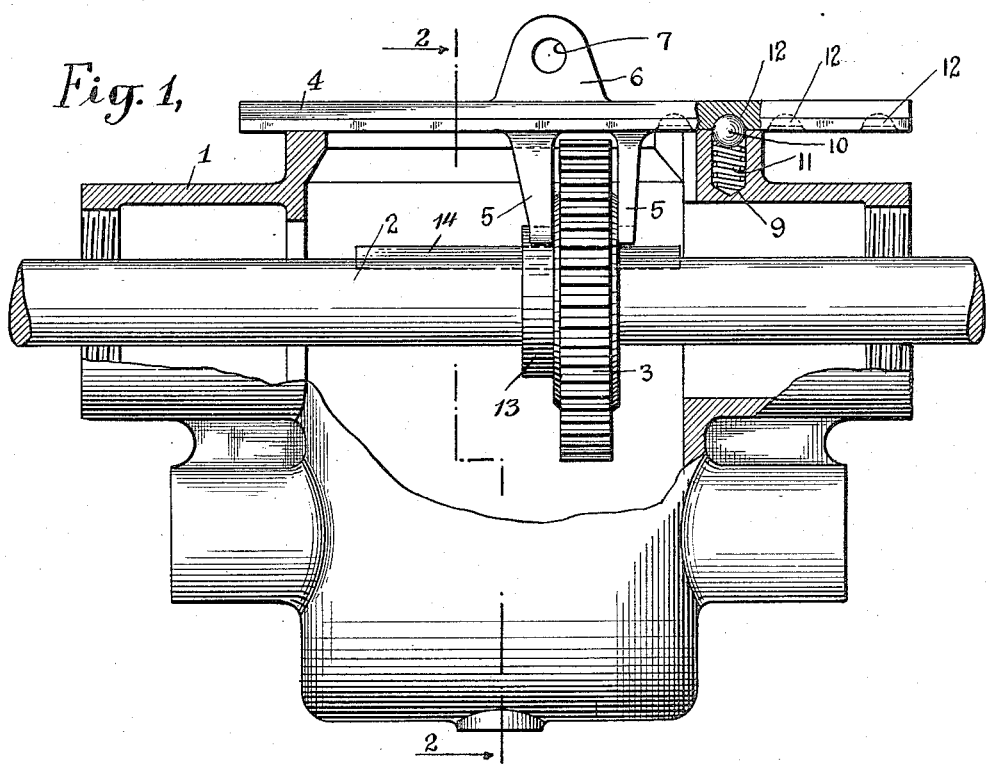
Fig. 1,
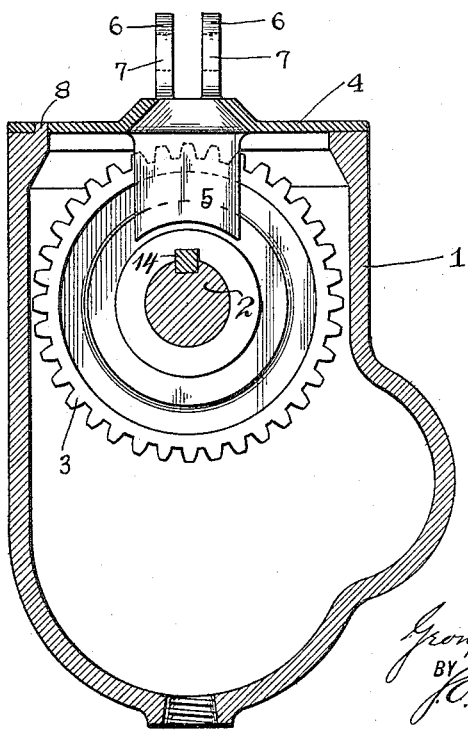
Fig. 2,
WITNESSES
Dyer Smith
J. McIntosh
INVENTOR
George T. Hanchett
BY
J. C. Edmunds
ATTORNEY

UNITED STATES PATENT OFFICE.

GEORGE T. HANCHETT, OF NEW YORK, N. Y.

GEAR-SHIFTING DEVICE.

1,152,809.

Specification of Letters Patent.

Patented Sept. 7, 1915.

Application filed July 24, 1914. Serial No. 852,329.

*To all whom it may concern:*

Be it known that I, GEORGE T. HANCHETT, a citizen of the United States, residing in the borough of Manhattan, city, county, and State of New York, have invented certain new and useful Improvements in Gear-Shifting Devices, of which the following is a specification.

My invention relates to gear shifting devices, and particularly to devices for shifting the slidable gear of a set of transmission change gears inclosed in a suitable casing, and used in the power transmission of an automobile.

The transmission gears of an automobile are commonly incased and various arrangements have heretofore been used for shifting the slidable gear-member into its various positions of engagement with the change gears for providing the different speeds of the car.

In accordance with my invention, the gear case is provided with a movable cover which is shiftable into various positions by the driver of the car and which cover itself carries on its inner side means for shifting the sliding gear of the transmission into its various positions. In this arrangement, the sliding cover plate of the gear case is sufficiently long to cover the opening in the gear case above which it is seated in all of the operative positions of the cover. The gears are thus protected against dirt, etc., while at the same time the interior of the gear case is readily accessible for inspection. By a construction, such as referred to, I have provided a simple and efficient device, and one which contains few parts and which is comparatively inexpensive to manufacture.

The object of my invention is accordingly the provision of improved devices of the character above briefly described.

In order that my invention may be more clearly understood, attention is hereby directed to the accompanying drawings forming part of the specification and illustrating a preferred embodiment of my invention.

In the drawings, Figure 1 represents a vertical section through a gear case having a sliding gear shifting cover plate, and Fig. 2 represents a cross-section taken on line 2—2 of Fig. 1.

Referring to the drawings, the gear case 1 of any approved design, has a shaft 2 extending through the same, which shaft has mounted thereon the slidable gear 3 of the gear transmission. Other gears with which gear 3 is adapted to engage are mounted upon a shaft or shafts extending through the gear case, parallel to shaft 2. I have not deemed it necessary to illustrate the other gears of the transmission within the gear case, since any suitable form of transmission may be used in which the gear 3 is shifted in the direction of its axis into engagement with other gears for changing the speed of the machine in the well known manner.

The casting comprising gear case 1 is open on one side, preferably the top, which is provided with a sliding cover plate 4. Cover plate 4 has integral therewith or secured thereto inwardly projecting lugs 5, one on each side of the shiftable gear 3, and adapted to shift the same in the well known manner when cover plate 4 is moved in a direction parallel to the axis of shaft 2. Cover plate 4 is provided with suitable means, whereby the same may be shifted, preferably a pair of upstanding lugs 6 having alined openings 7 therethrough in which may be mounted a pin engaged by a gear shifting lever operated by the driver of the car in the usual manner. Suitable means for guiding the cover plate in its sliding movement are provided, such as the upwardly extending rail 8 on the surface of the gear case, extending parallel to shaft 2 and engaging within a corresponding recess on the cover plate.

In order that the cover plate and the gear 3 may be frictionally retained in the various positions of engagement of gear 3 with the other gears with which gear 3 engages in varying the speed of the machine, any suitable means may be provided. As shown in the drawings, the gear casing is provided with a recess 9 in which is mounted a ball or balls 10 supported by a spring or springs 11 pressing ball 10 upwardly against the under side of the cover plate. The cover plate is provided on its under side with recesses 12 in which the ball or balls 10 are adapted to engage when gear 3 is in one of its gear engaging positions. If three speeds are to be provided, the cover plate 4 should be provided with three recesses or sets of recesses 12 corresponding to the different positions of gear 3. A hub for gear 3 is indicated at 13, and a key by which gear 3 is feathered to the shaft 2 at 14, in the drawings.

While my invention is particularly applicable for use in automobiles, it should be understood that the same is not limited in its usefulness to automobiles, but may be employed wherever an inclosed gear transmission is desirable.

Having now described my invention, what I claim as new therein and desire to secure by Letters Patent is as follows:—

1. In gear transmission devices, a gear case having a cover slidably mounted thereon, and a gear shifter mounted on the inner side of said cover, substantially as set forth.

2. In gear transmission devices, a gear case having a cover slidably mounted thereon, and a gear within said case slidably mounted for shifting into positions for engagement with other gears, said cover having inwardly extending projections for shifting said gear when the cover is moved, substantially as set forth.

3. A gear case having a cover plate slidably mounted thereon, and having a gear shifter mounted on the inner side thereof, a gear within said case shiftably mounted and adapted to be moved by said gear shifter into positions for engagement with other gears, and means for frictionally retaining said cover plate in positions corresponding to the positions of engagement of said gear, the cover plate being of sufficient length to cover the opening in the case in all of said positions, substantially as set forth.

4. A gear case having a cover plate slidably mounted thereon, and having a gear shifter mounted on the inner side thereof, a gear within said case shiftably mounted and adapted to be moved by said gear shifter into positions for engagement with other gears, and means on the gear case for guiding the cover plate in its sliding movement, said cover plate being of sufficient length to cover the opening in the case in all the gear-engaging positions of said shiftable gear, substantially as set forth.

This specification signed and witnessed this 3rd day of June, 1914.

GEORGE T. HANCHETT.

Witnesses:
F. D. DORMAN,
M. E. BUTLER.